Dec. 12, 1967 A. E. CRUMP 3,358,193

ELECTRIC SIGNAL SELECTION SYSTEMS

Filed Nov. 12, 1964 3 Sheets-Sheet 1

INVENTOR
ARTHUR EDGAR CRUMP
BY
Kirschstein, Kirschstein & Ottinger
ATTORNEYS

INVENTOR
ARTHUR EDGAR CRUMP
BY Kurchhofer, Kurchhofer & Ottinger
ATTORNEYS

Dec. 12, 1967 A. E. CRUMP 3,358,193

ELECTRIC SIGNAL SELECTION SYSTEMS

Filed Nov. 12, 1964 3 Sheets-Sheet 3

INVENTOR
ARTHUR EDGAR CRUMP
BY
[signature]
ATTORNEYS

United States Patent Office 3,358,193
Patented Dec. 12, 1967

3,358,193
ELECTRIC SIGNAL SELECTION SYSTEMS
Arthur Edgar Crump, Haywards Heath, England, assignor to The General Electric Company Limited, London, England
Filed Nov. 12, 1964, Ser. No. 410,364
Claims priority, application Great Britain, Nov. 13, 1963, 44,821/63
7 Claims. (Cl. 317—137)

This invention relates to electrical signal supply systems.

According to the present invention an electric signal supply system comprises at least three signal sources, to which signal sources a predetermined order of priority is ascribed, first and second two-condition switches each of which has first and second input paths, first and second output paths and means which in one condition of the switch serves to connect the first input path to the first output path and the second input path to the second output path and which in the other condition of the switch serves to connect the first input path to the second output path and the second input path to the first output path, means to connect two of the signal sources to the first and second input paths respectively of the first switch, means to connect the first output path of the first switch to the first input path of the second switch, means to connect a further one of the signal sources to the second input path of the second switch, an output point, means to connect the first output path of the second switch to said output point, and means responsive to the amplitudes of the signals appearing on the output paths of each of the switches to control the conditions of the respective switches, said last-mentioned means being so arranged that, during operation, of the signal sources that source which has the highest priority ascribed to it, of those which are supplying an output signal of an amplitude greater than a predetermined value, is connected to the output point by way of the first output path of the second switch.

An electric signal supply system in accordance with the present invention will now be described by way of example with reference to the accompanying drawings, of which:

Figure 1:
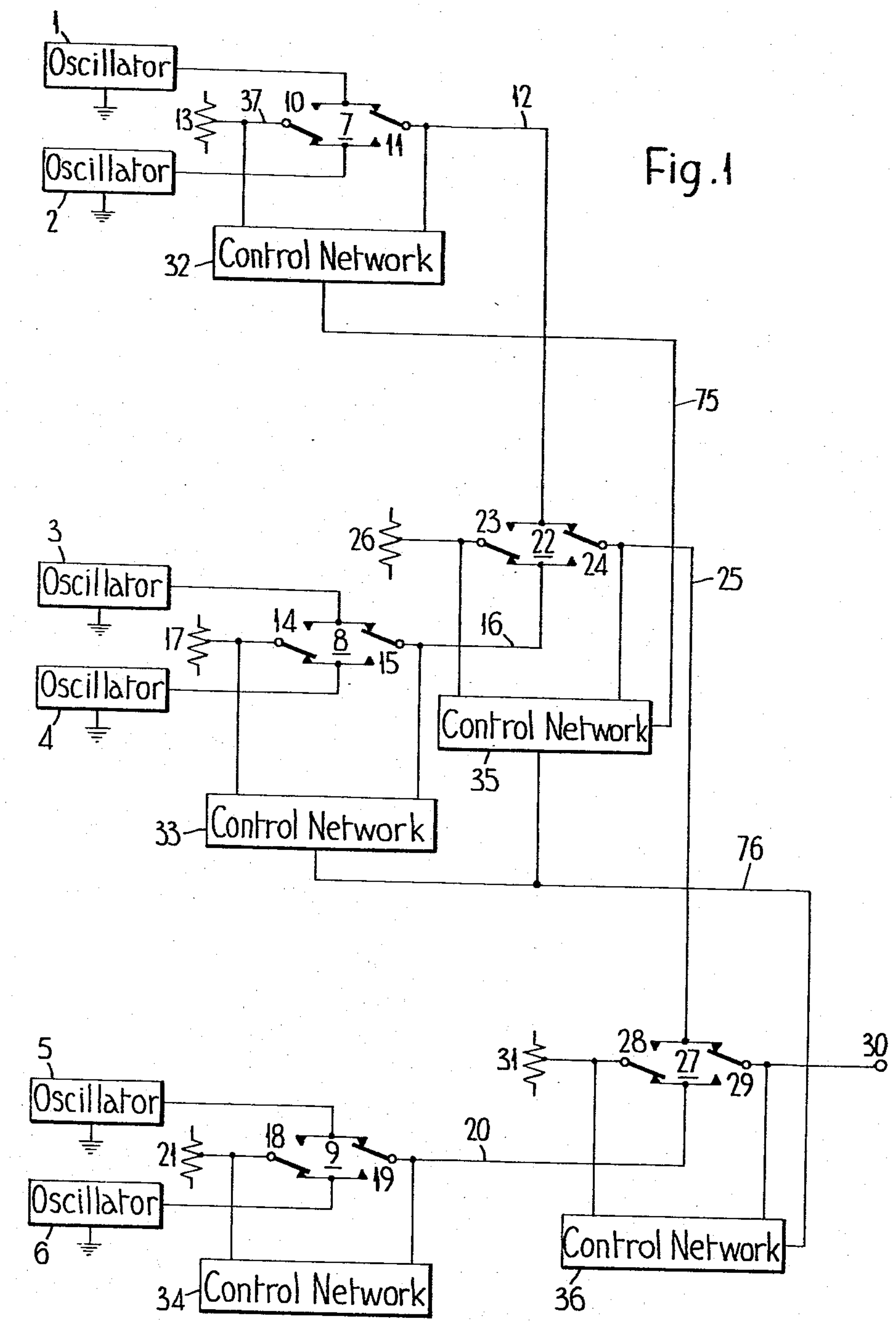
FIGURE 1 is a schematic representation of the system.

Referring to FIGURE 1, two oscillators 1 and 2 are connected to the two inputs respectively of a changeover switch 7, whose contacts 10 and 11 connect one of the oscillators 1 and 2 to a lead 12 and the other of the oscillators 1 and 2 to a dummy load 13.

Two further pairs of oscillators 3 and 4, and 5 and 6 are similarly connected to the inputs of changeover switches 8 and 9, respectively. Thus, by way of the contacts 14 and 15 of the switch 8 one of the oscillators 3 and 4 is connected to the lead 16 while the other of the oscillators 3 and 4 is connected to the dummy load 17. Similarly, by way of contacts 18 and 19 of the switch 9 one of the oscillators 5 and 6 is connected to a lead 20 while the other is connected to the dummy load 21.

The leads 12 and 16 from the switches 7 and 8, respectively, are connected to the two inputs of a changeover switch 22, and are therefore connected, by way of the contacts 23 and 24 of the switch 22 one to the lead 25 and the other to the dummy load 26. Similarly the leads 20 and 25 from the switches 9 and 22 respectively are connected to the two inputs of a changeover switch 27, so that, by way of the contacts 28 and 29 of the switch 27 one of the lines 20 and 25 is connected to the output point 30 while the other is connected to the dummy load 31.

Thus, in dependence upon the condition of the switches 7, 8, 9, 22 and 27 one or other of the six oscillators 1 to 6 is connected to the output point 30 while the other five ore connected to dummy loads.

Each of the changeover switches of the particular embodiment described comprises a pair of effectively single-pole two-way reed relays having mercury-wetted contacts. Each read relay has two operating windings, a current flow in one winding setting the relay contact in one of its positions and a current flow in the other winding setting the relay contact in the other of its positions, and the operating windings of each pair of relays are connected respectively in parallel, so that the relays operate simultaneously.

The changeover switches 7, 8, 9, 22 and 27 are under the control of control networks 32 to 36 respectively and are each operated in dependence upon the output levels of those of the sources 1 to 6 which are connected to them, as will be described. The control networks 32 to 36 are basically alike, and therefore only the network 32 associated with the switch 7 will be described in detail.

Figure 2:
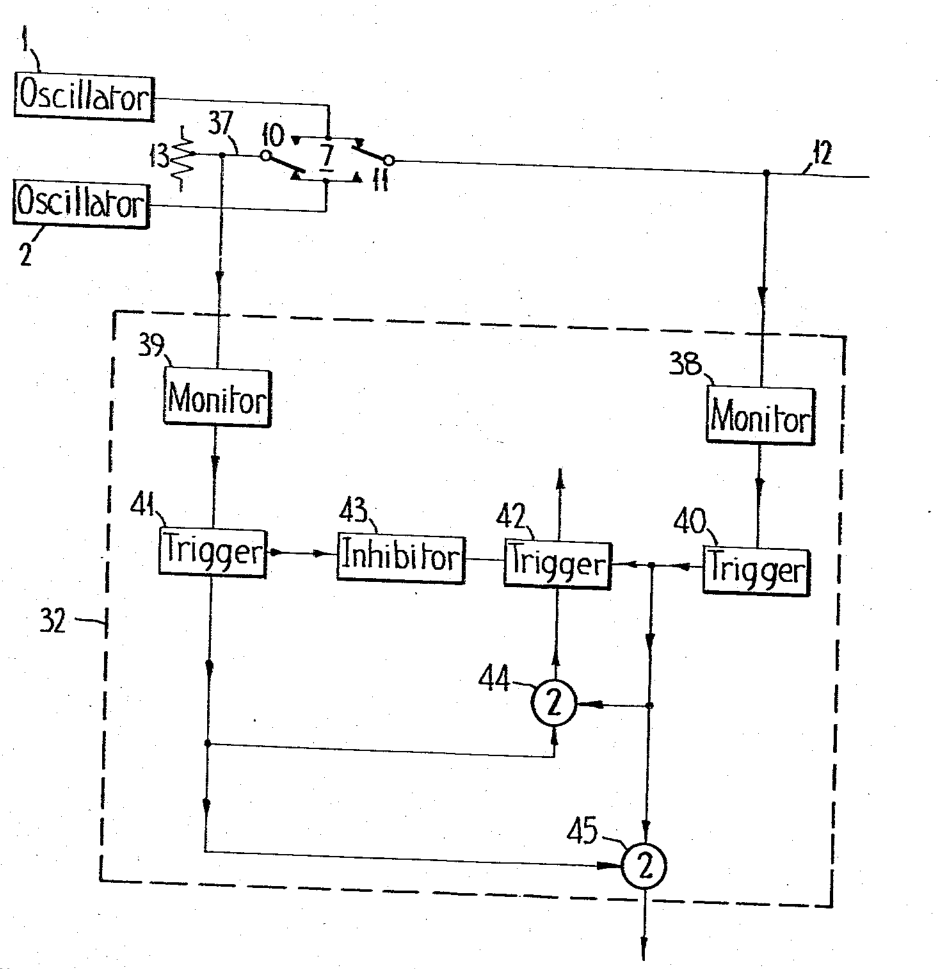
FIGURE 2 is a schematic representation of a part of the system shown in FIGURE 1.

Referring to FIGURE 2, connections are taken from the output leads 12 and 37 of the switch 7 to monitor circuits 38 and 39, respectively, the output signals of which are supplied to trigger circuits 40 and 41, respectively. Output signals from the trigger circuits 40 and 41 are supplied respectively to the input of a changeover trigger circuit 42, which controls the condition of the switch 7, and an inhibitor circuit 43, which is associated with the changeover trigger circuit 42. Output signals from the trigger circuits 40 and 41 are also taken to a restore gating circuit 44 and to an inhibit gating circuit 45.

Figure 3:
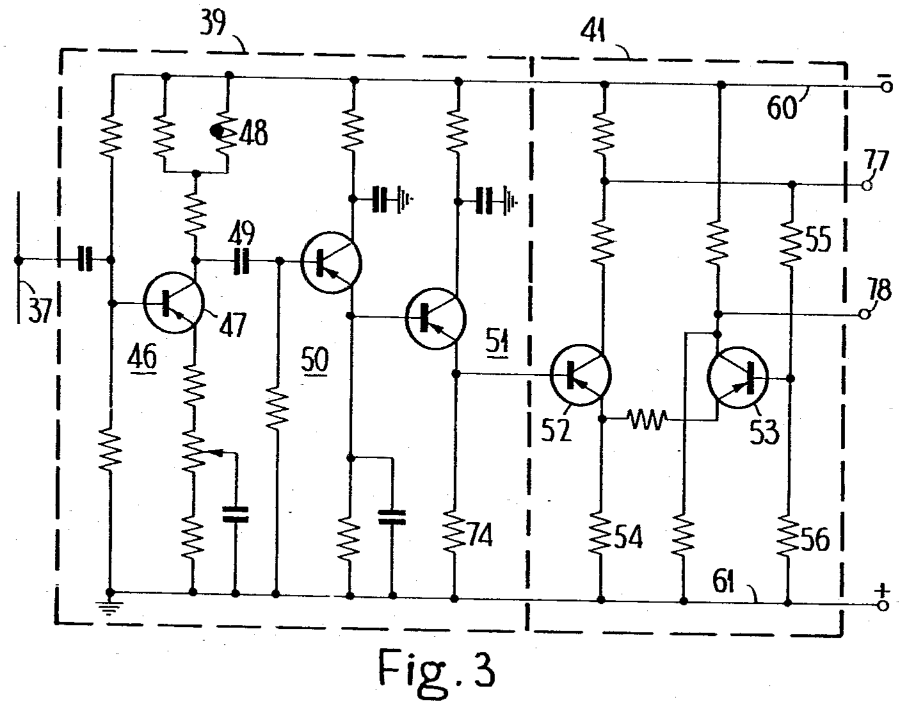
FIGURE 3 is a diagrammatic representation of a part of the system shown in FIGURE 1.

Referring to FIGURE 3, the monitor circuit 39, which is identical to the monitor 38, includes a common-emitter amplifier stage 46 the gain of which may be adjusted by varying the amount of negative feedback applied in the emitter circuit of the transistor 47. A degree of temperature compensation is provided by a thermistor 48 which forms part of the collector load of the transistor 47. The output signal from the stage 46 is passed, by way of a capacitor 49, to a rectifying stage 50 which supplies a direct-current signal to the input of the trigger circuit 41 by way of an emitter-follower buffer stage 51.

The trigger circuit 41, which is similar to the trigger circuit 40, comprises a pair of transistors 52 and 53 the emitter electrodes of which are connected together and to a common emitter resistor 54. The collector circuit of the transistor 52 is cross-connected to the base electrode of the transistor 53 by way of the divider network comprising resistors 55 and 56. The signal from the monitor circuit 39 is applied to the base electrode of the transistor 52, and output signals are taken from the collector circuits of the transistors 52 and 53 by way of output terminals 77 and 78 respectively. The trigger circuit 40 provides only one output signal, which is derived from the collector circuit of the transistor in that circuit which corresponds to the transistor 53 in the trigger circuit 41.

Figure 4:
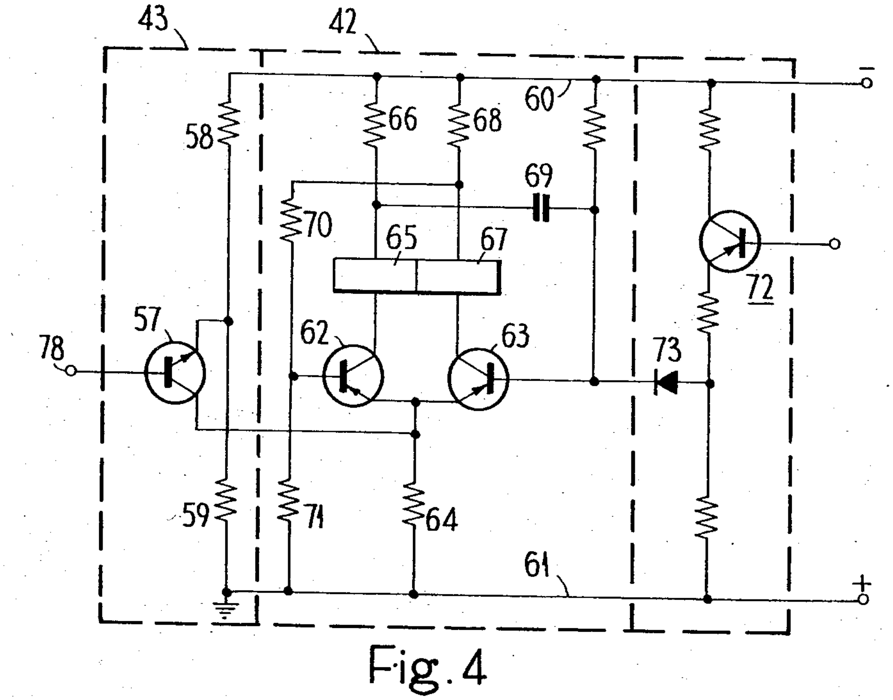
FIGURE 4 is a diagrammatic representation of a further part of the system shown in FIGURE 1.

Referring now to FIGURE 4, the inhibitor circuit 43 comprises a transistor 57, the emitter electrode of which is connected to the junction of two resistors 58 and 59, which are connected as potential divider network between a negative supply line 60 and a positive supply line 61. The base electrode of the transistor 57 is connected to receive an output signal for the trigger circuit 41 by way of the terminal 78.

The changeover trigger circuit 42 comprises a pair of transistors 62 and 63 having their emitter electrodes connected together and by way of a common emitter resistor 64 to the positive supply line 61. The collector electrode of the transistor 62 is connected to the negative supply line 60 by way of one operating winding 65 of the changeover switch 7 and a resistor 66, while the collector electrode of the transistor 63 is connected to the negative supply line 60 by way of the other operating winding 67 of the changeover switch 7 and a resistor 68. The junction between the winding 65 and the resistor 66 is connected to the base electrode of the transistor 63 by way of a capacitor 69, while the junction between the winding 67 and the resistor 68 is connected by way of resistors 70 and 71 in series to the supply line 61, the junction between the resistors 70 and 71 being connected to the base electrode of the transistor 62.

The collector electrode of the transistor 57 in the inhibiting circuit 43 is connected to the emitter electrodes of the transistors 62 and 63, and the output signal from the trigger circuit 40 is applied to the base electrode of the transistor 63 by way of an emitter-follower buffer stage 72 and a diode 73.

The oscillators 1 to 6 are each arranged to supply an output signal of a nominal amplitude at a frequency of sixty-four kilocycles per second, so that, during normal operation, a signal of this nominal amplitude and at this frequency is present on each of the leads 12 and 37, these signals being supplied by the oscillators 1 and 2, respectively.

The monitors, such as 38 and 39, in the control networks 32 to 36 each produce a direct-current output voltage the magnitude of which is dependent upon the amplitude of the oscillatory signal supplied to them from the respective output paths of the associated switches. In response to a signal of the nominal amplitude on the line 37, for example, the monitor 39 provides, across the emitter resistor 74 in the buffer stage 51, an output voltage of approximately three volts.

The trigger circuit 41 operates in one or other of two stable conditions or states in dependence upon the value of the output voltage of the monitor 39. If this voltage is greater than, say, one and a half volts (and in normal operation it will be approximately three volts as stated above) then the trigger circuit 41 is in a first stable state of operation in which the emitter-collector path of the transistor 52 is fully conducting and the emitter-collector path of the transistor 53 is non-conducting. If the amplitude of the signal appearing on the line 37 falls to, say, less than half of the nominal value, so that the voltage developed across the resistor 74 falls to less than one and a half volts, then the trigger circuit 41 changes abruptly to its second stable state of operation, in which the emitter-collector path of the transistor 52 is non-conducting and the emitter-collector path of the transistor 53 is fully conducting.

In the first stable state of the trigger circuit 41 the collector electrode of the transistor 53 is seventeen volts negative with respect to the positive supply line 61, while in the second stable state it is eleven volts negative with respect to the positive supply line 61. The fall in amplitude of the signal appearing on the line 37 to less than one half of the nominal value is regarded as a "failure" of the oscillator supplying the signal to the line 37, and this failure is indicated by the above-mentioned change in the output voltage at the terminal 78 of the trigger circuit 41 from seventeen volts negative to eleven volts negative with respect to the supply line 61.

The changeover trigger circuit 42 operates in a similar manner to the trigger circuits 40 and 41, in that it is capable of maintaining one or other of two stable states in dependence upon the voltage applied to its input, that is, the base electrode of the transistor 63. As mentioned above, the output signal from the trigger circuit 40 is applied to the base electrode of the transistor 63, by way of the buffer stage 72 and the diode 73, and it is arranged that if the oscillator supplying a signal to the line 12 is working normally, the changeover trigger circuit 42 is capable of maintaining a stable state in which transistor 63 is conducting and transistor 62 is cut-off, while a "failure" of the signal on the line 12 causes the trigger circuit 42 to be capable of changing abruptly to a state in which transistor 62 is conducting and transistor 63 is cut-off.

The phrase "capable of" has been used in the preceding paragraph to indicate that the operations described in that paragraph are conditional. In fact, the normal "trigger" operation of the circuit 42 is suspended whenever the output signal of the trigger circuit 41 indicates that the oscillator connected to the line 37 has failed. This suspension is achieved by the operation of the inhibitor circuit 43, which applies a sufficiently negative voltage to the emitter electrodes of the transistors 62 and 63 to hold them both cut off irrespective of the condition of the trigger circuit 40.

When the transistor 63 is conducting the current flow in the operating winding 67 of the switch 7 either brings the contacts 10 and 11 of the switch 7 to, or allows them to remain in, the positions shown in FIGURES 1 and 2. Similarly, current flow in the operating winding 65 either brings the contacts 10 and 11 of the switch 7 to, or allows them to remain in, positions opposite to those shown in FIGURES 1 and 2. If current flow in the windings 65 and 67 ceases the contacts 10 and 11 remain in the positions in which they were last set.

The operation of the control network 32 may be summarised as follows:

When both of the oscillators 1 and 2 are working normally the trigger circuits 40 and 41 are in their first stable states, the transistor 63 in the changeover circuit 42 is conducting and the consequent current flow in the operating winding 67 maintains the contacts 10 and 11 of the switch 7 in the positions shown in FIGURES 1 and 2.

If the oscillator 1 fails, the trigger circuit 40 changes to its second stable state, the circuit 42 changes over so that the transistor 62 is conducting, and the consequent current flow in the operating winding 65 causes the contacts 10 and 11 of the switch 7 to change over so that the oscillator 2 is now connected to the line 12, while the failed oscillator 1 is connected to the line 37. Since the oscillator 2 is working normally, the trigger circuit 40 returns to its first stable state, and the changeover circuit 42 would now return to its original condition but for the operation of the inhibitor circuit 43 in response to the "failure" of the signal supplied to the line 37, which is now connected to the oscillator 1. A slight delay in the operation of the circuit 42, due to the capacitor 69, ensures that this circuit does not return to its first stable state before the inhibitor circuit 43 can operate. When the oscillator 1 resumes normal operation the inhibitor circuit 43 ceases to operate, so that the changeover circuit 42 is free to return to its first stable state and thereby reset the contacts 10 and 11 of the switch 7 in their original positions.

If the oscillator 2 fails, the inhibitor circuit 43 operates, so that in the event of oscillator 1 also failing the changeover circuit 42 is prevented from altering the condition of the switch 7. When the oscillator 2 resumes normal operation the inhibitor circuit 43 ceases to operate.

If the oscillator 1 fails, so that the contacts 10 and 11 of the switch 7 changeover, and then the oscillator 2 fails, the network 32 will be in a condition in which the inhibitor circuit 43 is in operation and a "failure" indication is being supplied to the base electrode of the transistor 63 of the circuit 42. If the oscillator 1, which is connected to the line 37, resumes normal operation the inhibitor circuit 43 will cease to operate and the circuit 42 will take up its second stable state, whereupon the resulting current flow in the operating winding 65 of the switch 7 maintains the contacts 10 and 11 in the wrong positions, i.e., with the properly functioning oscillator 1 connected to the line 37 instead of to the line 12.

Under these conditions the restore gating circuit 44 is arranged to apply to the operating winding 67 of the switch 7, after a brief delay, a control current of sufficient magnitude to override the effect of the current already flowing in the winding 65, so that the switch 7 is reset in the required condition.

The restore gating circuit 44 has its operation delayed briefly because the conditions under which it operates also occur, transiently, when the oscillator 1 fails while the oscillator 2 is still working normally. The restore gating circuit 44 is not required to operate on such an occasion.

The switch 22 (FIGURE 1) and its associated control network 35 operate in the same way as the switch 7 and its control network 32, so that so long as a signal of the nominal amplitude is supplied to the line 12 by one or other of oscillators 1 and 2 the switch 22 remains in the condition shown in FIGURE 1. If both of the oscillators 1 and 2 fail the switch 22 changes over so that the oscillator 3 is connected to the line 25, while if the oscillator 3 also fails the switch 8 changes over so that the oscillator 4 is then connected to the line 25.

If all of oscillators 1 to 4 fail the switch 27 changes over from the position shown in FIGURE 1, so that one or other of the oscillators 5 and 6 is then connected to the output point 30. If one of the oscillators 1 to 4 subsequently resumes normal operation this oscillator is reconnected to the output point 30 by the action of the control network 36 and, if necessary, the action of the network 35 and/or either of the networks 32 and 33 on their respective switches, and if all of the oscillators resume normal operation the oscillator 1 will be reconnected to the output point 30.

From the above description it wil be seen that the system operates to connect to the output point 30 the lowest-numbered oscillator which is operating normally, or in other words an order of priority is built into the control networks 32 to 36 such that the oscillator which is connected as oscillator 1 is given the highest priority, the oscillator which is connected as oscillator 2 is given second highest priority and so on.

It will be appreciated that when the oscillator 1 fails this failure will be sensed not only in the control network 32 but also in the control networks 35 and 36, since the oscillator 1 is connected to the output point 30 by way of the line 12 and the line 25. If the oscillator 2 is working normally when the oscillator 1 fails, only the switch 7 is required to change over. In order to prevent an unnecessary changeover of the switch 22 while the changeover of the switch 27 is taking place an inhibiting signal is supplied by the inhibit gating circuit 45 (FIGURE 2), by way of the line 75, to the emitter electrodes of the transistors in the changeover trigger circuit of the control network 35. At the same time the inhibit gating circuit of the control network 35 responds to the failure of the signal on the line 25 by supplying an inhibit signal, by way of the line 76, to the emitter electrodes of the transistors in the changeover trigger circuit of the control network 36. Similar provisions are made for preventing an unnecessary changeover of the switch 27 in the event of oscillators 1 and 2 being inoperative and failure of the oscillator 3 initiating a changeover of the switch 8.

It will be appreciated that the system described above may readily be adapted to connect to an output point one source from any required number of sources in accordance with a predetermined order of priority.

A signal selection system of the type described is suitable for use in a multi-channel frequency-division multiplex telephony system having a plurality of repeater stations spaced between the terminal stations of the system.

Each repeater station of the telephony system has such a signal selection system and is provided with a pair of oscillators, which correspond to the oscillators 5 and 6, while the remaining four signals that are fed to the signal selection system and which correspond to the signals from the oscillators 1 to 4 are pilot signals supplied from two stations one on either side of said repeater station by way of respective pairs of transmission paths, these pilot signals possibly being combined in frequency division multiplex with signals carrying the channel intelligence. The signal selection system at a repeater station is arranged to select one of the six signals supplied to it, and the selected signal is used as a frequency standard, from which are derived in known manner signals having the carrier and/or subcarrier frequencies required at that station, and at the same time is retransmitted, to the two adjacent stations respectively, over two further pairs of transmission paths which may also carry channel intelligence signals in frequency-division multiplex. In this way it is arraged that in the absence of major faults, such as a breakdown of a transmission path, all of the repeater stations of the telephony system derive the required carrier and/or subcarrier frequency from a standard-frequency signal from the same original source, and retransmit standard-frequency signals from this source. The preferred original source, that is a preferred oscillator, may be located at a terminal station of the system.

I claim:

1. An electric signal supply system comprising at least three signals sources, to which signal sources a predetermined order of priority is ascribed, first and second two-condition switches each of which has first and second input paths, first and second output paths and means which in one condition of the switch serves to connect the first input path to the first output path and the second input path to the second output path and which in the other condition of the switch serves to connect the first input path to the second output path and the second input path to the first output path, means to connect two of the signal sources to the first and second input paths respectively of the first switch, means to connect the first output path of the first switch to the first input path of the second switch, means to connect a further one of the signal sources to the second input path of the second switch, an output point, means to connect the first output path of the second switch to said output point, and means responsive to the amplitudes of the signals appearing on the output paths of each of the switches to control the conditions of the respective switches, said last-mentioned means being so arranged that, during operation, of the signal sources that source which has the highest priority ascribed to it, of those which are supplying an output signal of an amplitude greater than a predetermined value, is connected to the output point by way of the first output path of the second switch.

2. An electric signal supply system in accordance with claim 1 wherein said means responsive to the amplitudes of the signals appearing on the output paths of each of the switches comprises two similar control networks associated one with each switch.

3. An electric signal supply system in accordance with claim 2 wherein each control network includes first sensing means connected to the first output path of the associated switch and second sensing means connected to the second output path of the associated switch, each of the sensing means being arranged to provide a unidirectional output signal having one of two discrete voltage levels in dependence upon the amplitude of the signal appearing on the output path to which the sensing means is connected.

4. An electric signal supply system in accordance with claim 3 wherein each sensing means comprises a rectifier circuit, a voltage-sensitive two-condition trigger circuit, and means to apply a signal voltage derived from the output of the rectifier circuit to control the condition of the trigger circuit.

5. An electric signal supply system in accordance with claim 1 wherein each of said switches comprises a pair of mercury wetted contact relays the respective operating windings of which are interconnected.

6. An electric signal supply system in accordance with claim 3 wherein each of said switches comprises a pair of mercury wetted contact relays the respective operating windings of which are interconnected, and each control network includes a two-condition trigger circuit which is responsive to the output signals from said sensing means to supply current signals to the operating windings of the associated pair of relays to control their conditions.

7. An electric signal supply system in accordance with claim 2 wherein the control network associated with the first switch includes means to inhibit the operation of the second switch in the event of the initiation of a change-over of the first switch from its first condition to its second condition.

No references cited.

MILTON O. HIRSHFIELD, *Primary Examiner.*

J. A. SILVERMAN, *Assistant Examiner.*